US009348581B2

(12) United States Patent
Farah et al.

(10) Patent No.: US 9,348,581 B2
(45) Date of Patent: May 24, 2016

(54) SYSTEMS, METHOD AND COMPUTER PROGRAM PRODUCTS FOR TRACKING AND VIEWING CHANGES TO INFORMATION STORED IN A DATA STRUCTURE

(75) Inventors: Hanna Farah, Ottawa (CA); Michal Antkiewicz, Waterloo (CA); Marcellus Mindel, Nepean (CA); Adam Murray, Ottawa (CA); Timothy Lethbridge, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1610 days.

(21) Appl. No.: 11/858,613

(22) Filed: Sep. 20, 2007

(65) Prior Publication Data
US 2008/0072209 A1    Mar. 20, 2008

(51) Int. Cl.
*G06F 9/44* (2006.01)

(52) U.S. Cl.
CPC .. *G06F 8/71* (2013.01); *G06F 8/10* (2013.01); *G06F 8/73* (2013.01)

(58) Field of Classification Search
CPC ............... G06F 8/10; G06F 8/71; G06F 8/73
USPC .................................................. 717/111, 113
See application file for complete search history.

(56) References Cited

U.S. PATENT DOCUMENTS

| 6,067,541 | A | * | 5/2000 | Raju et al. | 707/999.003 |
| 6,111,575 | A | * | 8/2000 | Martinez et al. | 715/810 |
| 6,185,591 | B1 | * | 2/2001 | Baker et al. | 715/210 |
| 6,523,134 | B2 | * | 2/2003 | Korenshtein | 714/16 |
| 2004/0225998 | A1 | * | 11/2004 | Van De Vanter et al. | 717/113 |
| 2004/0268187 | A1 | * | 12/2004 | Burke et al. | 714/40 |
| 2005/0240756 | A1 | * | 10/2005 | Mayer | 713/2 |
| 2006/0053126 | A1 | * | 3/2006 | Baca et al. | 707/100 |

OTHER PUBLICATIONS

Agostini et al., "Undo in Workflow Management Systems," Springer-Verlag, 2003, 14pg.*
Grundy et al., "Inconsistency Management for Multiple-View Software Development Environments," IEEE, 1998, 20pg.*

* cited by examiner

*Primary Examiner* — Ryan Coyer
(74) *Attorney, Agent, or Firm* — Steven M. Greenberg, Esq.; CRGO LAW

(57) ABSTRACT

Previous attempts to provide systems or processes for enabling the review of the development of information stored in an electronic file are difficult to use effectively and require a user to take active steps to ensure that versions and annotations are created at regular intervals. By contrast, provided by aspects of the present invention there are systems, methods and computer program products for tracking and viewing changes to information stored in a data structure. In some embodiments the systems, methods and computer program products can be combined or integrated with software providing a visual editing environment so that changes are detected, sorted and monitored in a manner that is transparent to the user. In more specific embodiments the changes are grouped according to type, and optionally sub-type, so that a user can use the types to filter which changes in the development history of the information to review according to a particular current desire to locate specific information. In other specific embodiments, the changes are grouped in time providing temporal groups that provide "snapshots" of the development history of the information stored in a data structure at various respective points in the past.

37 Claims, 4 Drawing Sheets

SYSTEMS, METHOD AND COMPUTER PROGRAM PRODUCTS FOR TRACKING AND VIEWING CHANGES TO INFORMATION STORED IN A DATA STRUCTURE

FIELD OF THE INVENTION

The invention relates to data management, and in particular to systems, methods and computer program products for tracking and viewing changes to information stored in a data structure.

BACKGROUND OF THE INVENTION

Software systems commonly support visual editing environments where users can manipulate data or visual abstractions of data to create design models, graphics and/or text-based documents that are stored in electronic files. The electronic files contain data structures that store information created and manipulated in a visual editing environment. For example, some electronic files store complex design models that are created using a Unified Modeling Language (UML), such as those used to enable the computer-based design of integrated circuits, mechanical drawings, and even the functional modeling of computer code using block diagrams and the like. Other electronic files store text-based files created using word processing software. Complex text-based files store information in a structured format so that attributes applied to the text (e.g. italics, underlining, fonts, footnotes, etc.) can be accurately recreated when the file is opened and viewed by users, exported or printed.

After a period of development or editing the information stored in the data structures may be so complex that it is difficult to understand by simple visual inspection. For example, a user, reviewing the information for the first time, may be unable to identify the portions of information that are most relevant for their current purpose, or may be overwhelmed by the details and subsequently overlook information relevant to their current purpose. Additionally, reviewing only the information stored in the data structure, as reproduced in a suitable visual editing environment, may not necessarily reveal the rationale behind design choices that have shaped the information stored in the data structure as it currently exists. Some of these issues may be more pertinent for design models created using CAD (Computer Automated Design) tools (e.g. to represent circuit diagrams, functional blocks and mechanical drawings, etc.) than for text-based files created using word processing software. However, in both instances it may be useful to review the development history of the information represented to attempt to understand the meaning of the information represented.

Prior attempts to store the development history include "drilling down", version control management, recording annotations, and maintaining persistent "undo" stacks. The concept of drilling down (or "opening down") is typically related to viewing design models created using CAD tools. At a high level of abstraction a design model is schematically represented by an interconnected combination of functional blocks or schematically represented components. Each functional block is an abstraction of a system, process, apparatus or component feature, and each functional block has one or more electronic files storing requisite information defining the particular functional block. Drilling down is the process of selecting and viewing the details of a functional block within the visual editing environment in order to review the underlying information in a functional block. Despite breaking visually abstracted information into more manageable, and possibly reusable, modules this method of organizing and storing information does not inherently provide any way to track the actual development history of a high level design and the design choices that shaped the design into its current state.

As an alternative, version control management is another option used in the prior art. Version control management systems or processes are typically implemented such that multiple versions of a design model or text-based file are stored, where each version is a copy of the design model or text-based file as it existed at some prior point in the development. Version control management systems or processes are clumsy and difficult to use and maintain. A user must explicitly load earlier versions and run "compare-merge" operations to reveal and track changes between versions. Moreover, the number of details that are changed between versions (i.e. "the delta") tends to be large and unpredictable since users are in control of creating new versions. And users typically only create new versions after doing extensive amounts of work.

Another alternative that has been combined with drilling down and version control management is recording annotations. Annotations are comments or notes added by a developer/writer during the course of development or writing/editing. However, since annotations are typically left to a user to add, annotations are not always and/or consistently added and stored. Consequently, the use of annotations is often ad hoc and sparse. An alternative, is to incorporate a rationale tracking tool to explicitly document all design decisions. However, such tools are cumbersome and slow down the development process, and thus, are not widely employed.

Lastly, is the use of persistent undo stacks. In a typical software tool (e.g. word processor or CAD tool) a stack of "undoable" commands (i.e. commands that can be reversed) is stored while the information in an electronic file is being edited in the visual editing environment. Most software tools delete the stack when a user closes the visual editing environment or saves the current state of the electronic file as a version. However, some tools have implemented a persistent undo stack in which the information in the stack of undoable commands is stored within the data structure of the electronic file. There are several drawbacks related to using a persistent undo stack for reviewing the development history of information stored in an electronic file. First, undoing the changes inherently undoes the work done to date and a "redo" function must be used to restore the information to the state it was in when the user opened the file. This is a cumbersome way of trying to track the development of the information stored in an electronic file. Second, if a user undoes changes and then starts editing the information, as it existed in a previous state, all of the subsequent undo/redo states are lost. Consequently, the information cannot be restored to the state it was in when the electronic file was opened, unless the user remembers exactly the state of the information and is capable of reproducing the work. Third, the granularity of the undo stack is very fine. It includes all undoable commands irrespective of the actual importance of each command to the development of the information stored in an electronic file. Simply reversing all changes to get to a previous point in the development of the information typically results in confusion and, as already noted, any edits at a prior interim position would introduce errors and/or effectively destroy the quality of the information created to date.

SUMMARY OF THE INVENTION

According to an aspect of an embodiment of the invention, there is provided a computer-implemented method for tracking and viewing changes to information stored in a data structure of a corresponding electronic file that is manipulable in a visual editing environment, the method comprising: recording all changes affecting the information stored in the data structure, there being at least two distinct types of changes; receiving user input identifying one or more of the at least two distinct types of changes to form one or more selected change types; and generating a visual representation of the information structure, the visual representation showing the effect of reversal of all changes of the one or more selected change types that were made after a certain point in time, wherein the visual representation displays the effects of all other types of changes made after the point in time and displays the effects of all changes made before the point in time.

According to some aspects of the invention, the user input identifies one or more, but less than all, of the at least two distinct types of changes to form one or more selected change types. According to other aspects of the invention, the one or more selected change types includes substantive changes, and wherein all other types of changes are layout changes. According to other aspects of the invention, the one or more selected change types include important changes, and wherein all other types of changes are unimportant changes.

According to some aspects of the invention, a subset of one or more types of changes, that are considered important changes, is designated by a user. According to other aspects of the invention, the important changes comprise changes of predefined types.

According to aspects of the invention, the user input identifies the one or more of the at least two distinct types of changes that will form the selected change types directly by explicitly selecting the one or more of the at least two distinct types of changes. According to other aspects of the invention, the user input identifies the one or more of the at least two distinct types of changes that will form the selected change types indirectly by explicitly selecting all other types of changes. According to even other aspects of the invention, the user input comprises selecting a rule and the one or more of the at least two distinct types of changes that will form the selected change types are types of changes that satisfy the rule.

According to some aspects of the invention, the information stored in the data structure is at least one of computer source code, an abstract model of computer source code and an abstract model of a design of at least part of a computer program. According to other aspects of the invention, the information stored in the data structure is an electronic document, such as, but not limited to, one of a word processing document, a spreadsheet, or a slide presentation. According to other aspects of the invention, the information stored in the data structure is a design model developed using a computer aided design software tool.

According to some aspects of the invention, recording all changes affecting the information stored in the data structure including: monitoring an undo stack maintained by a software tool providing a visual editing environment, the undo stack storing a sequence of "undoable" commands for corresponding actions in the visual editing environment; detecting the addition of a new undoable command onto the undo stack, the new undoable command representing a change made in the visual editing environment to the information stored in the data structure; processing a copy of the new undoable command to produce a detail record of the change made in the visual editing environment; and storing a copy of the detailed record.

According to some more specific aspects of the invention, a detailed record for a particular change includes a plurality of fields, wherein a first field is provided to store an indication of the actual change made, a second field is provided to store an indication of the type of change made, a third field is provided to store a rank value, and a fourth field is provided to store a time stamp value. According to even more specific aspects of the invention, the rank value is used to indicate relative importance of one of the actual change and the type of change stored in the detailed record. According to other more specific aspects of the invention, the time stamp value is relative to one of an arbitrary time, the current time and the last time a change was made. In yet even more specific aspects of the invention, the detailed record also includes a fifth field used to store an indication of the sub-type of change made.

According to yet another aspect of an embodiment of the invention, there is provided a computer program product for tracking and viewing changes to information stored in a data structure of a corresponding electronic file that is manipulable in a visual editing environment provided by a software tool, the computer program product comprising: first data store for storing a change log in which detailed records of corresponding changes to the information stored in a data structure are stored; a second data store for storing a listing of default settings, wherein the default settings define at least two distinct types of changes that can be made in the visual editing environment; an eavesdropper module comprising computer program instructions for monitoring an undo stack provided by the software tool to support the visual editing environment, and retrieving a copy of each new undoable command added to the undo stack; a change compiler comprising computer program instructions for receiving a copy of each undoable command retrieved by the eavesdropper and converting each undoable command into a respective detailed record of a corresponding change made in the visual editing environment, wherein a detailed record for a particular change includes at least an indication of the actual change made, an indication of the type of change made, a rank value and a time stamp value; a recorder comprising computer program instructions for storing each detailed record created by the change compiler; and an interface module comprising computer program instructions for retrieving stored detailed records and sending the retrieved detailed records to the software tool to be displayed in the visual editing environment.

In some embodiments, the computer program product includes another data store for storing user preferences, and wherein the change compiler further comprises computer program instructions for using the user preferences to define the at least two distinct types of changes that can be made in the visual editing environment.

In some embodiments, the computer program product includes another data store for storing user provided annotations, and wherein the change compiler further comprises computer program instructions for incorporating the annotations into the detailed records for corresponding changes.

In some embodiments, the change compiler further comprises computer program instructions for using the user preferences to determine the relative importance of different types of changes made in relation to one another.

In some embodiments, the interface module further comprises computer program instructions for receiving user input identifying one or more of the at least two distinct types of changes to form one or more selected change types.

In some embodiments, the interface module further comprises computer program instructions for generating a visual representation of information stored in the data structure, the visual representation showing the effect of reversal of all changes of the one or more selected change types that were made after a certain point in time, wherein the visual representation displays the effects of all other types of changes made after the point in time and displays the effects of all changes made before the point in time.

In some embodiments, the interface module further comprises computer program instructions for permitting the user to input identifies one or more of the at least two distinct types of changes to form one or more selected change types.

In some embodiments, the interface module further comprises computer program instructions for permitting the user to identify one or more of the at least two distinct types of changes that will form the selected change types directly by explicitly selecting the one or more of the at least two distinct types of changes.

In some embodiments, the interface module further comprises computer program instructions for permitting the user to identify one or more of the at least two distinct types of changes that will form the selected change types indirectly by explicitly selecting all other types of changes.

In some embodiments, the interface module further comprises computer program instructions for permitting the user to select a rule and the one or more of the at least two distinct types of changes that will form the selected change types are types of changes that satisfy the rule.

In some embodiments, the information stored in the data structure is at least one of computer source code, an abstract model of computer source code and an abstract model of a design of at least part of a computer program. In other embodiments, the information stored in the data structure is an electronic document, such as, but not limited to, one of a word processing document, a spreadsheet, or a slide presentation. In other embodiments, the information stored in the data structure is a design model developed using a computer aided design software tool.

In some embodiments, eavesdropper module comprises computer program code for: monitoring an undo stack maintained by a software tool providing a visual editing environment, the undo stack storing a sequence of "undoable" commands for corresponding actions in the visual editing environment; detecting the addition of a new undoable command onto the undo stack, the new undoable command representing a change made in the visual editing environment to the information stored in the data structure; and retrieving a copy of the new undoable command and passing the same to the change compiler.

In some embodiments, the rank value is used to indicate relative importance of one of the actual change and the type of change stored in the detailed record. In some embodiments, the time stamp value is relative to one of an arbitrary time, the current time and the last time a change was made.

According to yet another aspect of an embodiment of the invention, there is provided a system for tracking and viewing changes to information stored in a data structure of a corresponding electronic file that is manipulable in a visual editing environment provided by a software tool, the system comprising: a processor for processing computer program instructions; a display for displaying information stored in a data structure in a visual editing environment; first data store for storing a change log in which detailed records of corresponding changes to the information stored in a data structure are stored; a second data store for storing a listing of default settings, wherein the default settings define at least two distinct types of changes that can be made in the visual editing environment; an eavesdropper module comprising computer program instructions for monitoring an undo stack provided by the software tool to support the visual editing environment, and retrieving a copy of each new undoable command added to the undo stack; a change compiler comprising computer program instructions for receiving a copy of each undoable command retrieved by the eavesdropper and converting each undoable command into a respective detailed record of a corresponding change made in the visual editing environment, wherein a detailed record for a particular change includes at least an indication of the actual change made, an indication of the type of change made, a rank value and a time stamp value; a recorder comprising computer program instructions for storing each detailed record created by the change compiler; and an interface module comprising computer program instructions for retrieving stored detailed records and sending the retrieved detailed records to the software tool to be displayed in the visual editing environment.

Other aspects and features of the present invention will become apparent to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Figure 1:
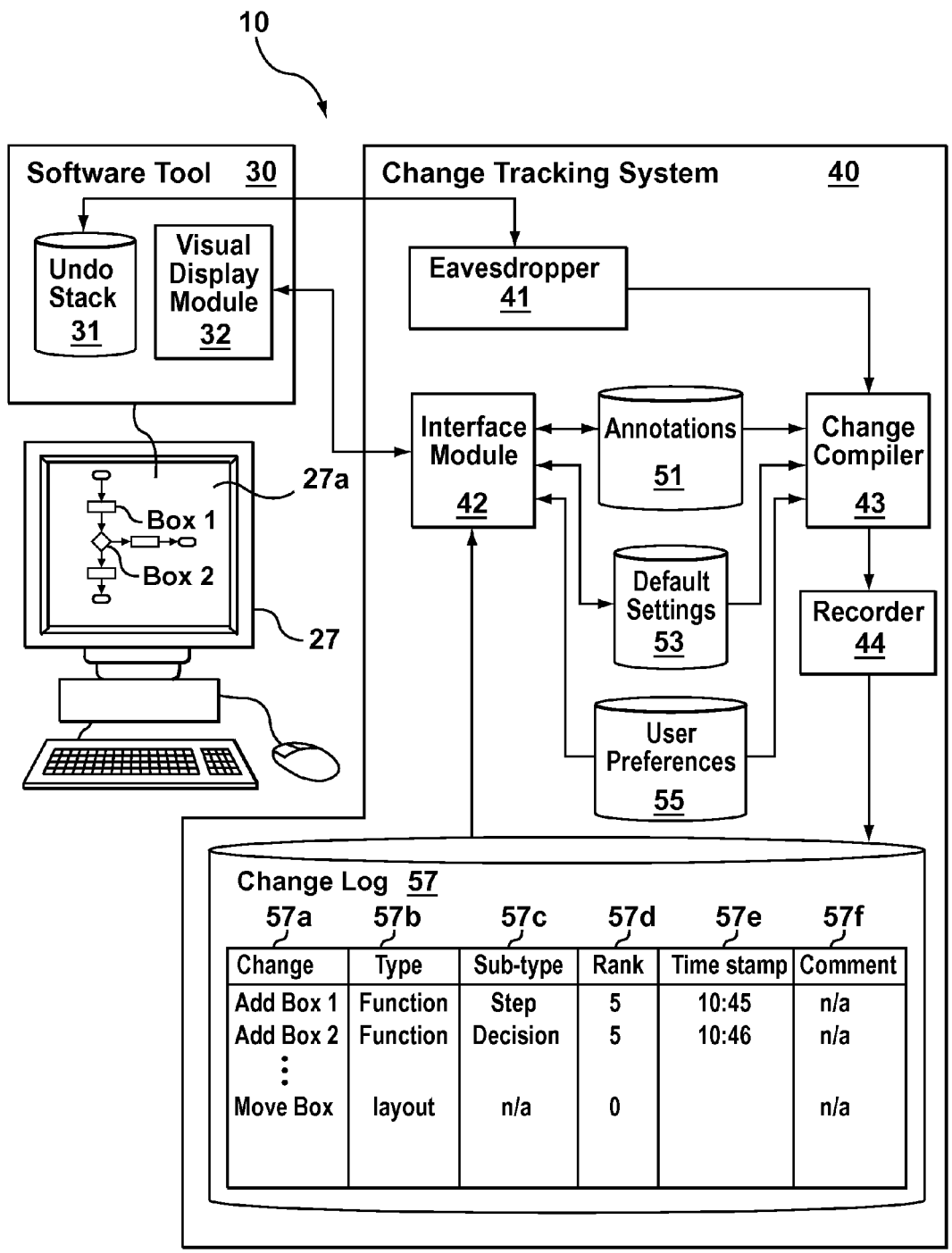
FIG. 1 is a schematic illustration of a system including computer program product provided according to aspects of the invention.

Previous attempts to provide systems or processes for enabling the review of the development of information stored in an electronic file are difficult to use effectively and require a user to take active steps to ensure that versions and annotations are created at regular intervals. By contrast, provided by aspects of the present invention there are systems, methods and computer program products for tracking and viewing changes to information stored in a data structure. In some embodiments the systems, methods and computer program products can be combined or integrated with software providing a visual editing environment so that changes are detected, sorted and monitored in a manner that is transparent to the user. In more specific embodiments the changes are grouped according to type, and optionally sub-type, so that a user can use the types to filter which changes in the development history of the information to review according to a particular current desire to locate specific information. In other specific embodiments, the changes are grouped in time providing temporal groups that provide "snapshots" of the development history of the information stored in a data structure at various respective points in the past.

That is, aspects of the current invention builds on the general principle of temporal division, but does so in a novel and more effective way than previously available version control management systems. Aspects of the present invention use, inter alia, annotation, change tracking, and persistent "undo" stacks.

More specifically, aspects of the present invention are directed to computer-implemented methods, data processing systems, and computer program products for presenting information stored in a data structure that can be viewed and manipulated in a visual editing environment. The information structure could be source code, an abstract representation of source code, an electronic document, or the like. As changes are made to the information representation, these changes are recorded. Preferably, when any change, no matter how minor, is made to the information, the change is stored in a detailed record so that particular types of changes can be reviewed relative to the current state of the information, while other types of changes are ignored. Moreover, reviewing the combination of changes relative to the current state of the information does not inherently undo work done, as would occur if the persistent undo stack was used to review previous changes. Change recording is preferably 'always on' just as, in most software tools, 'undo/redo' is 'always on'. In fact, in one embodiment, the lowest level of granularity of recorded changes is the same as that of undo/redo.

In accordance with aspects of the invention, changes to the information stored in a data structure are divided into a plurality of different types, wherein the types can be any useful categorization. For example only, in the context of a word processing document or a visual representation of (all or part of) a computer program, changes could be divided into substantive changes (which are those changes that affect the content) and layout changes (which are those changes that only affect the position of the content within the information structure). In addition, changes could be categorized, either by a user or automatically, as either important or unimportant, or into relative categories of importance, ranging from very important to unimportant. For categories organized on a basis other than importance, it is preferable that the system automatically categorize the changes. As such, some embodiments of the invention may include a data store storing default settings for, inter alia, defining the different types of changes that are stored. More specific aspects of the invention are described below with reference to FIGS. 1-4.

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a particular embodiment, the invention is implemented in a combination of hardware and firmware, which includes, but is not limited to firmware, resident software, microcode and the like.

Additionally and/or alternatively, aspects of the invention can be embodied in the form of a computer program product that is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by, or in connection with, the instruction execution system, apparatus, or device.

A computer-readable medium can be an electronic, magnetic, optical, electromagnetic, infrared, or semiconductor system (or apparatus or device) or a propagation medium. Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk—read only memory (CD-ROM), compact disk—read/write (CD-R/W) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Additionally and/or alternatively, in accordance with aspects of the invention, a data processing system suitable for storing and/or executing program code will include at least one processor integrated with memory elements through a system bus.

Input/output (i.e. I/O devices)—including but not limited to keyboards, touch-pads, displays, pointing devices, etc.—can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

FIG. 1 is a schematic illustration of a system 10 including computer program product for tracking and viewing changes to information stored in a data structure within a visual editing environment provided according to aspects of the invention. The computer program product is hereinafter referred to as the change tracking system 40, as is illustrated in FIG. 1. Moreover, the system 10 illustrated in FIG. 1 includes only those features and elements necessary to describe specific aspects of the invention. Those skilled in the art will appreciate that a system may include any suitable combination of hardware, software and firmware required to implement the desired functionality of a particular system.

The system 10 includes a workstation computer 27, hereinafter referred to as simply the workstation 27. The workstation 27 includes a monitor (or display) 27a. In other embodiments, the workstation 27 is a client device receiving data for a server or the like. The system also includes a software tool 30 and the aforementioned change tracking system 40.

The software tool 30 is provided as a simplified example of a software tool provide a visual editing environment in which information stored in a particular type of data structure can be created and manipulated. The software tool 30 can run on either the workstation 27 or a server computer (or the like) to which the workstation 27 is connected. Examples of such information include, without limitation, word processing documents, spreadsheets, slide presentations, complex design models that are created using a Unified Modeling Language (UML), such as those used to enable the computer-based design of integrated circuits, mechanical drawings, and even the functional modeling of computer code using block diagrams and the like. The software tool includes an undo stack 31 and a visual display module 32. The undo stack 31 may be a persistent undo stack or a conventional undo stack. Moreover, the presence of any type of undo stack is not necessary, since the change tracking system 40 can be modified to operate in the absence of an undo stack of any type. This modification will be described below with specific reference to the change tracking system 40. The visual display module 32 is an abstraction of the computer program code, that is included with the software tool 30, for displaying the visual editing environment on the monitor 27*a* of the workstation.

The change tracking system 40 may also be implemented as a computer program product running on the workstation 27 or on a server computer to which the workstation 27 is connected. Additionally and/or alternatively, the change tracking system 40 can be implemented using a suitable combination of hardware, software and firmware that is either fully or partially integrated with the workstation or stands alone as a separate device connectable to a workstation or server on which the software tool 30 runs.

The change tracking system 40 embodies a number of functions that may be implemented in a number of different ways in accordance with aspects of the invention. FIG. 1 provides a very specific logical abstraction for implementing the features of the change tracking system 40 as a combination of interconnected functional blocks. Those skilled in the art will appreciate that this is only one example of such an abstraction and will also understand that various other abstractions are possible without departing from the scope of the following claims.

With specific reference to FIG. 1, the change tracking system 40 includes an eavesdropper 41, an interface module 42, a change compiler 43 and a recorder 44, each of which serves as a separate functional block implementing portions of the methods provided in accordance with the invention. The change tracking system 40 in FIG. 1 also includes four data stores—an annotations data store 51, a default settings data store 53, a user preferences data store 55 and a change log 57. Each of the data stores are portions of memory that may or may not be included in the same physical memory device.

The eavesdropper 41 is provided for monitoring the undo stack 31 of the software tool. If an undo stack is not provided, the eavesdropper 41 can instead be adapted to monitor inputs from the user that are received by the software tool that changes the information stored in a data structure and displayed in the visual editing environment. The eavesdropper 41 provides any changes made to the change compiler 43 that is provided for creating a detailed record of each change made to the information stored in the data structure. An explanation of the contents of the detailed records and how they may be created is provided below. The recorder 44 is provided for storing the detailed records in the change log 57. The interface module 42 is provided for receiving user (or system) inputs which may be for recording annotations in the annotations data store 51, changing or resetting the default settings in the default setting data store 53, defining user preferences in the user preferences data store 55 and accessing the detailed records in the change log 57.

In operation, the change compiler 43 receives information relating to changes made to information stored in a data structure within the visual editing environment from the eavesdropper 41, which monitors the software tool 30 to detect such changes. The change compiler 43 operates to create a respective detailed record for each change received. This can be accomplished in a number of different ways. However, for the sake of brevity only one specific example with possible alternatives is described herein.

In accordance with aspects of the invention a detailed record of a change includes at least a distinction of the type of change made, there being at least two possible types of changes. With specific reference to FIG. 1, the change log 57 includes a number of fields that each store a portion of a particular detailed record. The first field 57*a* is provided to store an indication of the actual change made (e.g. Add "Box 1"). The second field 57*b* is provided to store an indication of the type of change made (e.g. function block added). The third field 57*c* is provided to store an indication of the sub-type (e.g. decision block). The fourth field 57*d* is provided to store a rank value (e.g. on a multi-level relative scale of importance). The fifth field 57*e* is provided to store a time stamp value indicating when a particulate change was made. And lastly, the sixth field 57*f* is provided to store a comment (or annotation) or pointer to a particular annotation in the annotation data store 51. In this very specific example, each of the sixth fields, 57*a-f*, provides a stores a respective portion of a detailed record corresponding to a change made. For the sake of example only, only three such changes are shown recorded in the change log 57.

Those skilled in the art will appreciate that a detailed record for a change may contain more or less information than that shown in the sixth fields, 57*a-f*, in FIG. 1, and the only requirement for such detailed records is that there must be at least two type of possible changes that a change to the information can be classified as. Any other information in the detailed records is optional. And how such additional information can be determined, created or added to detailed records depends on a specific implementation of the system, method and computer program product in accordance with aspects of the invention. With further reference to FIG. 1, the change compiler 43 is the functional block responsible for combining all of the known information into a detailed record corresponding to a particular change. As such, the change compiler 43 shown in FIG. 1 may access the annotations data store 51, the default settings data store 53 and the user preferences data 55 in order to create each detailed record.

As shown in FIG. 1, all detailed records are stored in a single file or location (i.e. the change log 57). Additionally and/or alternatively, the detailed records may be organized into more than one file or location. In another embodiment, the type of change can be identified at the time the change is made, each change of a particular type is recorded in a separate file. Within a given file, there could be records of changes of an overall type, with gradations into subtypes (all changes of any such subtype being recorded in the file for the overall type). In addition, supplemental information (such as the importance of a change) can be associated with the change record some time after the change is made (for example because importance may only become known in the context of other changes).

The interface module 42 can be used by the user to retrieve detailed records from the change log 57. The information in the detailed records is combined with the information stored in the data structure as it currently exists so that the user can track the changes in the visual editing environment by manipulating a control. When reviewing the changes, a filter can be applied to identify which types of changes are to be included in the visual representation and which are to be excluded.

In operation, user input is received by the interface module 42. The user input will identify one or more of the distinct types of changes tracked by the change tracking system. For example, a user may wish to see only substantive changes to a word processing document, while maintaining the most recent layout.

In response to the user input, the interface module 42 in combination with the visual display module 32 will generate a visual representation of the information stored in the data structure which shows the effect of reversing all of the selected types of changes that were made after a certain point in time, but does not show any reversal of any of the types of changes that were not selected.

For example, in the case of a visual representation of a computer program, a developer may make any number of layout changes in addition to adding boxes and connectors representing program code. Simply reversing all of the changes (i.e. repeated application of an "undo" command) would likely result in confusion, since the boxes and connectors would appear to be moving around as the changes were reversed. By providing an ability to select only certain changes, aspects of the present invention enable the developer to, for example, exclude changes that affected only layout (i.e. position of boxes and connectors). Accordingly, the developer could view a visual representation in which all boxes and connectors remained in their final position, and view a change history showing only the addition of new boxes and connectors.

In a particular embodiment, a user interface according to aspects of the present invention may be provided with a slider which enables a user, after having selected which types of changes he or she wishes to view, to select a point in time (with non-selected changes excluded) to be represented by the visual representation by adjusting the slider. A mouse, joystick, keyboard or other user input device may be used in conjunction with, or as an alternative to, the slider. The user interface can advantageously present an animation of the selected changes as the user moves the slider, or, alternatively, can cause the image to move between "snapshots" of the visual representation at particular points in time (again, with non-selected changes excluded). Marker identifying the 'snapshots' are preferably automatically (but optionally manually) added to the recorded evolutionary history of the model, which allows the user to jump though the model's evolution in meaningful steps. At the lowest level of granularity, a snapshot marker is added whenever a user finishes working with one particular model element and starts working with another. For example, in a word-processing environment, the model elements at the lowest level would likely be sentences. Thus, "snapshots" would show the visual representation with multiple changes applied or reversed (for example, only changes above a certain category of importance might be shown).

Optionally, higher-level groupings of snapshots (forming an arbitrary hierarchy) are added to allow the understander to more quickly jump through the evolution. For example, in a word processing system, higher level groupings could be added as the user moves to different paragraphs, sections, chapters, etc.

Additionally, aspects of the invention may provide for the inclusion of "temporal annotations", whereby a user can record the reason that a change was made so that the same user (or another user) can better understand why the change was made when later reviewing those changes. Temporal annotations corresponding to any point in time can be added in the evolution of a model. Such annotations can be added at the point in time when the change is made, or later. Also, temporal annotations can be deleted or modified at any time. For example, a user could position a mouse pointer over the changed portion of the visual representation to cause a pop-up window containing the annotation to appear, and to enable modification or deletion.

Figure 2:
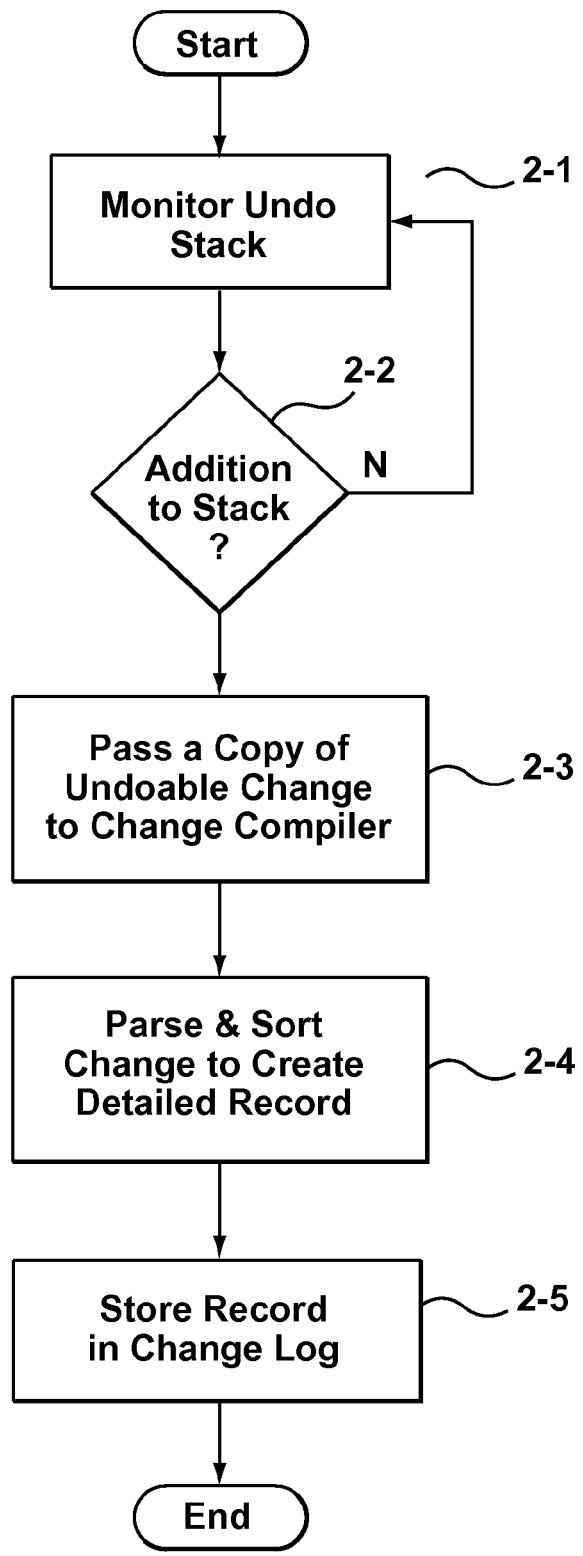
FIG. 2 is a flow chart illustrating general method steps for storing detailed records corresponding to changes made to information stored in a data structure in accordance with aspects of the invention.
Figure 3:
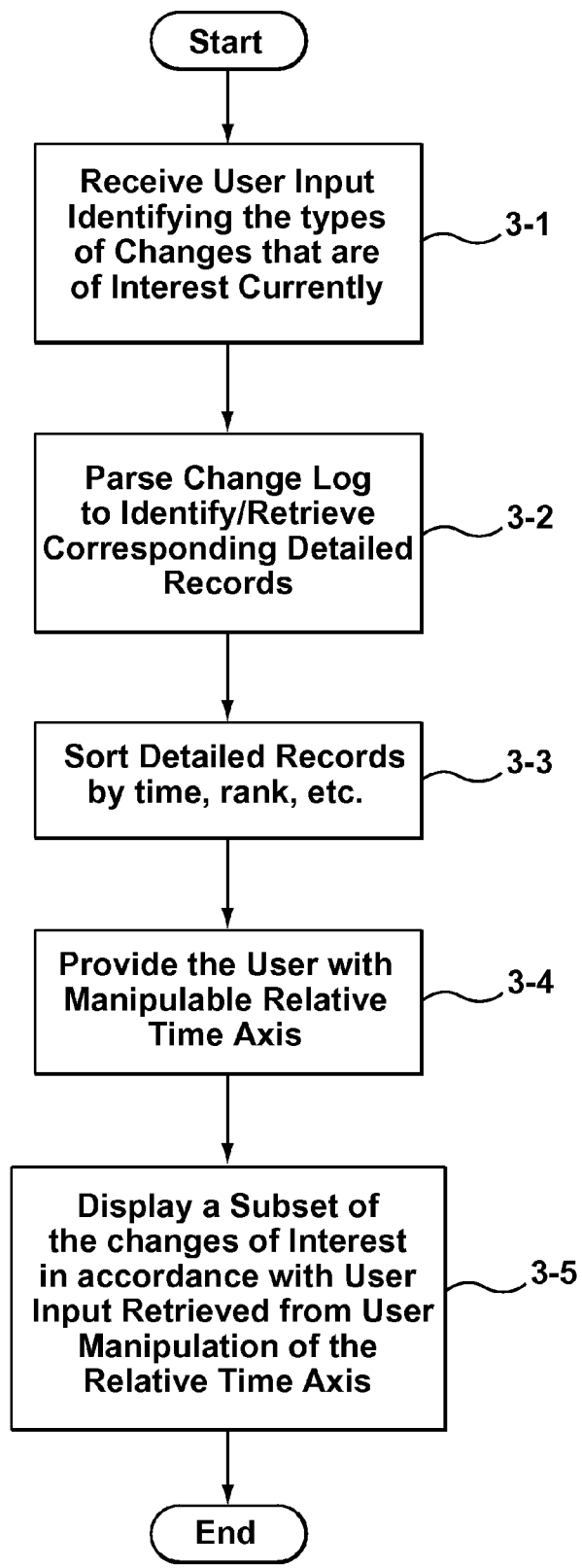
FIG. 3 is a flow chart illustrating general method steps for retrieving and displaying user selected changes to information stored in a data structure in accordance with aspects of the invention.

For further clarification, aspects of the above description of the operation of the change tracking system 40 according to aspects of the invention are depicted in the flow charts provided in FIGS. 2 and 3.

Referring first to FIG. 2, shown is a flow chart illustrating the general method steps for storing detailed records corresponding to changes made to information stored in a data structure in accordance with aspects of the invention. Starting at step 2-1, the method includes monitoring the undo stack maintained by a software tool. As noted above, the method is not restricted to circumstances where an undo stack is provided. Accordingly, additionally and or alternatively, the method may be adapted to include sensing a change made within the visual editing environment provided by a software tool.

At step 2-2 the method includes determining whether or not there has been an addition to the undo stack. If an addition to the undo stack has been made (yes path, step 2-2), the method includes proceeding to step 2-3. If there has not been an addition to the undo stack (no path, step 2-2), the method includes looping back to step 2-1.

At step 2-3 the method includes passing a copy of the undoable change, pushed onto the undo stack, to a change compiler for further and parallel processing. At step 2-4, the method includes parsing and sorting the undoable change to create a detailed record of the change that can be stored in the change log. To that end, the change compiler may access a number of different data stores in order to create a detailed record according to the specifications and requirements of a user (e.g. by accessing a user preferences data store). Step 2-5 of the method includes storing the detailed record in the change log.

Turning to FIG. 3, shown is a flow chart illustrating a very specific method steps for retrieving and displaying user selected changes to information stored in a data structure in accordance with aspects of the invention. Starting at step 3-1, the method includes receiving an input from a user identifying the types of changes that are of interest to the user currently. For example, the user may only wish to see the additions of functional blocks as they exist in their final positions, as opposed to seeing how the functional blocks were added and then moved around.

Step 3-2 of the method includes parsing (or searching) the change log to identify and/or retrieve corresponding detailed records that include the types of changes desired by the user. That is, the types of changes desired by the user are used as filters to parse the change log in order to identify detailed records relevant to the user. Step 3-3 of the method includes sorting the relevant detailed records according to at least one of a number of possible criteria. For example, and without limitation, the relevant detailed records can be sorted by their corresponding times stamps, ranks and/or by sub-type. Step 3-4 of the method includes providing the user with a manipulable relative time axis in the visual editing environment, such as, without limitation, a scrollbar or slider or even a list of icons. Step 3-5 of the method includes displaying a subset of the relevant changes in the visual editing environment in accordance with user manipulation of the relative time axis, so that the development history of the information stored in the data structure can be reviewed without actually making real changes to the information as currently stored in the data structure. That is, the information in the data structure is combined with the information in the detailed records to create a visual history of the development of the information stored in the data structure.

Figure 4:
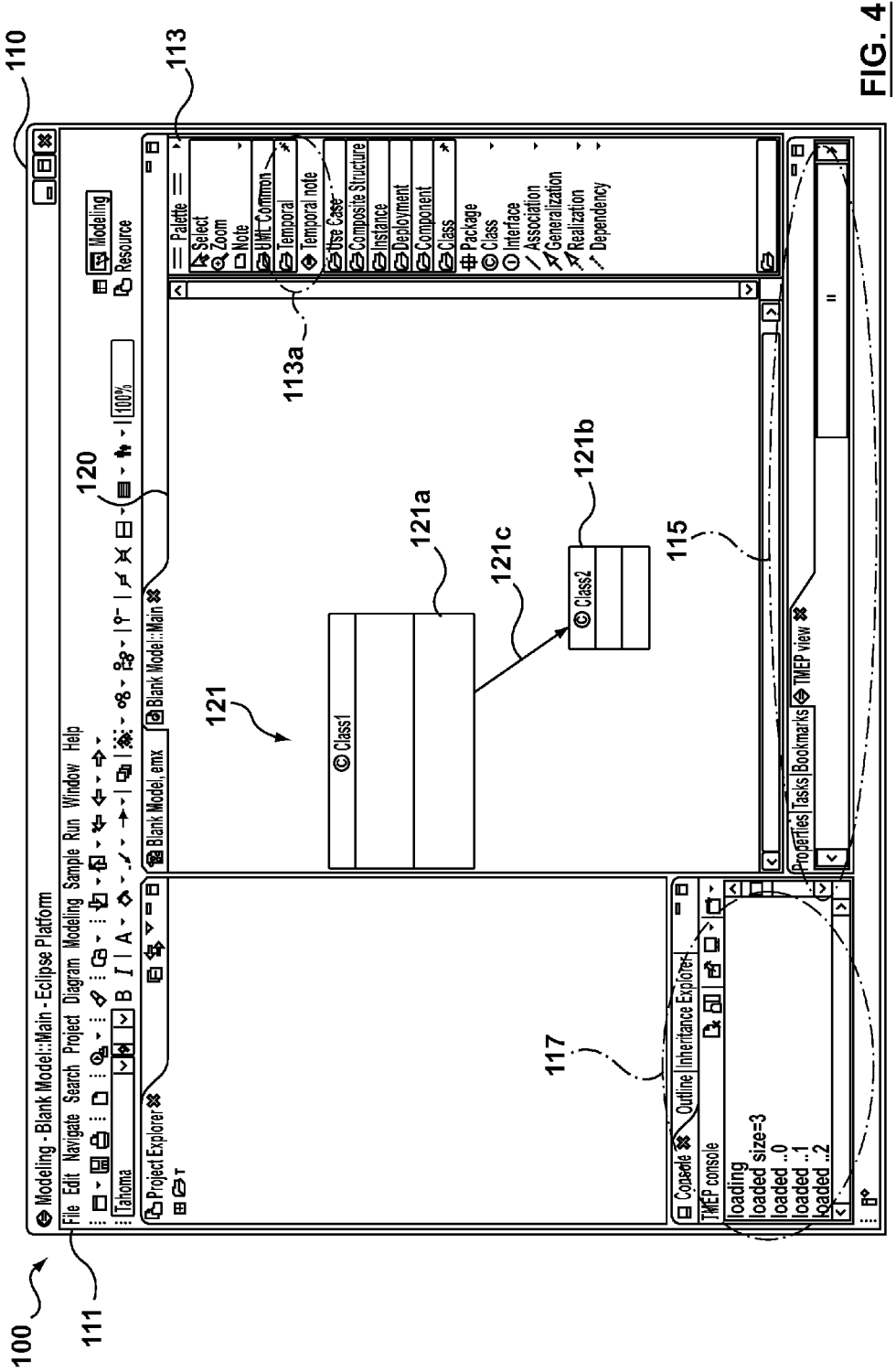
FIG. 4 is a screenshot of a graphical user interface showing features added to a visual editing environment for tracking and viewing changes to information stored in a data structure in accordance with aspects of the invention.

FIG. 4 is a screenshot 100 of a Graphical User Interface (GUI) showing features added to a visual editing environment for tracking and viewing changes to information stored in a data structure in accordance with aspects of the invention. The GUI includes a window 110 with a drop down menu 111. Within the window 110, the GUI includes a palette 113 which includes menu items 113a for adding temporal annotations in accordance with aspects of the invention. The GUI also includes a visual editing environment window 120. As an example only, functional blocks 121a and 121b, which are connected by a data flow indicator 121c, are included in the visual editing environment window 120 and together comprise a simple example functional block diagram 120. The GUI also includes a user manipulable relative time axis 115 in the form or a horizontal scroll bar (or slider). In operation, the user can move the scroll bar to view various past versions of the information stored in the data structure within the visual editing environment window 120. Again, the past versions are created as respective combinations of information in detailed records of changes and the information stored in the data structure. Lastly, the GUI includes a history/status window 117 showing the status of current and previously issued user commands.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above disclosure.

We claim:

1. A computer-implemented method for tracking and viewing changes to information stored in a data structure of a corresponding electronic file that is manipulable in a visual editing environment, the method comprising:
   recording all changes affecting the information stored in the data structure there being at least two distinct types of changes;
   receiving user input identifying one or more of the at least two distinct types of changes to form one or more selected change types; and
   generating a visual representation of the information stored in the data structure, the visual representation showing an effect of reversal of all changes of the one or more selected change types that were made after a certain point in time, wherein the visual representation displays effects of all other types of changes made after the point in time and displays effects of all changes made before the point in time and automatically adding a marker to the data structure upon a user finishing work with a model element and beginning work on a different model element in the corresponding electronic file the marker identifying the visual representation, the marker identifying the visual representation.

2. The method according to claim 1, wherein the user input identifies one or more, but less than all, of the at least two distinct types of changes to form one or more selected change types.

3. The method according to claim 1, wherein the one or more selected change types includes substantive changes, and wherein all other types of changes are layout changes.

4. The method according to claim 1, wherein the one or more selected change types include changes marked as being considered important, and wherein all other types of changes are considered unimportant changes.

5. The method according to claim 4, wherein a subset of one or more types of changes, that are considered important changes, is designated by a user.

6. The method according to claim 4, wherein the changes marked as being considered important comprise changes of predefined types.

7. The method according to claim 1, wherein the user input identifies one or more of the at least two distinct types of changes that will form the selected change types directly by explicitly selecting one or more of the at least two distinct types of changes.

8. The method according to claim 1, wherein the user input identifies one or more of the at least two distinct types of changes that will form the selected change types indirectly by explicitly selecting all other types of changes.

9. The method according to claim 1, wherein the user input comprises selecting a rule and the one or more of the at least two distinct types of changes that will form the selected change types are types of changes that satisfy the rule.

10. The method according to claim 1, wherein the information stored in the data structure is at least one of computer source code, an abstract model of computer source code and an abstract model of a design of at least part of a computer program.

11. The method according to claim 1, wherein the information stored in the data structure is an electronic document.

12. The method of according to claim 11, wherein the electronic document is one of a word processing document, a spreadsheet, and a slide presentation.

13. The method according to claim 1, wherein the information stored in the data structure is a design model developed using a computer aided design software tool.

14. The method according to claim 1, wherein recording all changes affecting the information stored in the data structure comprises:
   monitoring an undo stack maintained by a software tool providing a visual editing environment, the undo stack storing a sequence of "undoable" commands for corresponding actions in the visual editing environment;
   detecting the addition of a new undoable command onto the undo stack, the new undoable command representing a change made in the visual editing environment to the information stored in the data structure;
   processing a copy of the new undoable command to produce a detail record of the change made in the visual editing environment; and
   storing a copy of the detailed record.

15. The method according to claim 14, wherein a detailed record for a particular change includes a plurality of fields, wherein a first field is provided to store an indication of the actual change made, a second field is provided to store an indication of the type of change made, a third field is provided to store a rank value, and a fourth field is provided to store a time stamp value.

16. The method according to claim 15, wherein the rank value is used to indicate relative importance of one of the actual change and the type of change stored in the detailed record.

17. The method according to claim 15, wherein the time stamp value is relative to one of an arbitrary time, a current time and a last time the particular change was made.

18. The method according to claim 15, wherein the detailed record also includes a fifth field used to store an indication of the sub-type of change made.

19. A computer program product comprising a computer usable storage medium storing computer program instructions for tracking and viewing changes to information stored in a data structure of a corresponding electronic file that is manipulable in a visual editing environment provided by a software tool, the computer program product comprising:
   a first data store for storing a change log in which detailed records of corresponding changes to the information stored in the data structure are stored, the change log further recording an automatic addition of a marker to the data structure upon a user finishing work with a model element and beginning work on a different model element in the corresponding electronic file;

a second data store for storing a listing of default settings, wherein the default settings define at least two distinct types of changes that can be made in the visual editing environment;

an eavesdropper module comprising computer program instructions for monitoring an undo stack provided by the software tool to support the visual editing environment, and retrieving a copy of each new undoable command added to the undo stack;

a change compiler executing in memory of a computer, the change compiler comprising computer program instructions for receiving a copy of each undoable command retrieved by the eavesdropper and converting each undoable command into a respective detailed record of a corresponding change made in the visual editing environment, wherein a detailed record for a particular change includes at least an indication of the actual change made, an indication of the type of change made, a rank value and a time stamp value;

a recorder comprising computer program instructions for storing each detailed record created by the change compiler; and an interface module comprising computer program instructions for retrieving stored detailed records and sending the retrieved detailed records to the software tool to be displayed in the visual editing environment, the computer program instructions of the interface module generating a visual representation of information stored in the data structure, the visual representation showing the effect of reversal of all changes of the one or more selected change types that were made after a certain point in time, wherein the visual representation displays the effects of all other types of changes made after the point in time and displays the effects of all changes made before the point in time, the marker identifying the visual representation.

20. The computer program product according to claim 19, further comprising a third data store for storing user preferences, and wherein the change compiler further comprises computer program instructions for using the user preferences to define the at least two distinct types of changes that can be made in the visual editing environment.

21. The computer program product according to claim 20, wherein the change compiler further comprises computer program instructions for using the user preferences to determine a relative importance of different types of changes made in relation to one another.

22. The computer program product according to claim 19, wherein the interface module further comprises computer program instructions for receiving user input identifying one or more of the at least two distinct types of changes to form one or more selected change types.

23. The computer program product according to claim 19, wherein the interface module further comprises computer program instructions for generating a visual representation of information stored in the data structure, the visual representation showing the effect of reversal of all changes of the one or more selected change types that were made after a certain point in time, wherein the visual representation displays the effects of all other types of changes made after the point in time and displays the effects of all changes made before the point in time.

24. The computer program product according to claim 19, wherein the interface module further comprises computer program instructions for permitting the user to identify one or more of the at least two distinct types of changes to form one or more selected change types.

25. The computer program product according to claim 24, wherein the interface module further comprises computer program instructions for permitting the user to identify one or more of the at least two distinct types of changes that will form the selected change types directly by explicitly selecting the one or more of the at least two distinct types of changes.

26. The computer program product according to claim 24, wherein the interface module further comprises computer program instructions for permitting the user to identify one or more of the at least two distinct types of changes that will form the selected change types indirectly by explicitly selecting all other types of changes.

27. The computer program product according to claim 24, wherein the interface module further comprises computer program instructions for permitting the user to select a rule and the one or more of the at least two distinct types of changes that will form the selected change types are types of changes that satisfy the rule.

28. The computer program product according to claim 19, wherein the information stored in the data structure is at least one of computer source code, an abstract model of computer source code and an abstract model of a design of at least part of a computer program.

29. The computer program product according to claim 19, wherein the information stored in the data structure is an electronic document.

30. The computer program product according to claim 29, wherein the electronic document is one of a word processing document, a spreadsheet, and a slide presentation.

31. The computer program product according to claim 19, wherein the information stored in the data structure is a design model developed using a computer aided design software tool.

32. The computer program product according to claim 19, wherein eavesdropper module comprises computer program code for:

monitoring an undo stack maintained by a software tool providing a visual editing environment, the undo stack storing a sequence of "undoable" commands for corresponding actions in the visual editing environment;

detecting the addition of a new undoable command onto the undo stack, the new undoable command representing a change made in the visual editing environment to the information stored in the data structure; and retrieving a copy of the new undoable command and passing the same to the change compiler.

33. The computer program product according to claim 19, wherein the rank value is used to indicate relative importance of one of the actual change and the type of change stored in the detailed record.

34. The computer program product according to claim 19, wherein the time stamp value is relative to one of an arbitrary time, a current time and a last time the particular change was made.

35. The computer program product according to claim 19, wherein a detailed record also stores an indication of the sub-type of change made.

36. The computer program product according to claim 19, a third data store for storing user provided annotations, and wherein the change compiler further comprises computer program instructions for incorporating the annotations into the detailed records for corresponding changes.

37. A system for tracking and viewing changes to information stored in a data structure of a corresponding electronic file that is manipulable in a visual editing environment provided by a software tool, the system comprising:

a processor for processing computer program instructions;

a display for displaying information stored in a data structure in a visual editing environment;

a first data store for storing a change log in which detailed records of corresponding changes to the information stored in a data structure are stored, the change log further recording an automatic addition of a marker to the data structure upon a user finishing work with a model element and beginning work on a different model element in the corresponding electronic file;

a second data store for storing a listing of default settings, wherein the default settings define at least two distinct types of changes that can be made in the visual editing environment;

an eavesdropper module comprising computer program instructions for monitoring an undo stack provided by the software tool to support the visual editing environment, and retrieving a copy of each new undoable command added to the undo stack;

a change compiler comprising computer program instructions for receiving a copy of each undoable command retrieved by the eavesdropper and converting each undoable command into a respective detailed record of a corresponding change made in the visual editing environment, wherein a detailed record for a particular change includes at least an indication of the actual change made, an indication of the type of change made, a rank value and a time stamp value;

a recorder comprising computer program instructions for storing each detailed record created by the change compiler; and an interface module comprising computer program instructions for retrieving stored detailed records and sending the retrieved detailed records to the software tool to be displayed in the visual editing environment, the computer program instructions of the interface module generating a visual representation of information stored in the data structure, the visual representation showing the effect of reversal of all changes of the one or more selected change types that were made after a certain point in time, wherein the visual representation displays the effects of all other types of changes made after the point in time and displays the effects of all changes made before the point in time, the marker identifying the visual representation.

* * * * *